United States Patent [19]

Beck et al.

[11] Patent Number: 5,057,600

[45] Date of Patent: * Oct. 15, 1991

[54] PROCESS FOR FORMING AN ARTICLE COMPRISING POLY(ETHERETHERKETONE) (PEEK) TYPE POLYMERS

[75] Inventors: Henry N. Beck, Walnut Creek; Richard A. Lundgard, Antioch, both of Calif.

[73] Assignee: The Dow Chemical Company, Midland, Mich.

[*] Notice: The portion of the term of this patent subsequent to Feb. 27, 2007 has been disclaimed.

[21] Appl. No.: 107,699

[22] Filed: Oct. 9, 1987

[51] Int. Cl.$^5$ .................. C08G 6/00; C08G 8/02; C08G 14/00

[52] U.S. Cl. .................. 528/480; 528/125; 528/126; 528/128; 528/491; 264/41; 264/203; 210/500.25; 210/500.27; 210/500.28

[58] Field of Search .............. 528/491, 480, 125, 126, 528/128; 264/41, 203; 210/500.23, 500.27, 500.28

[56] References Cited

U.S. PATENT DOCUMENTS 4,118,363 10/1978 Smith .................. 524/371
4,320,224 3/1982 Rose et al. .................. 528/125

FOREIGN PATENT DOCUMENTS 62-93190 4/1987 Japan .
2180790A 4/1987 United Kingdom .

OTHER PUBLICATIONS

H. W. Hill, "Polymers Containing Sulfer" *Enc. of Chemical Technology*, vol. 18, pp. 793-814, John Wiley and Sons, New York, (1982).
J. Davis, "Composites, High Performance", *Encyclopedia of Chemical Technology*, Supplement Volume, pp. 260-281, John Wiley and Sons, New York, (1984).
K. Dahl, "Heat Resistant Semicrystalline Poly(phenylene Ether Ketones). Melt Processable High Performance Polymers", *Industrial Affiliates Program, Department of Chemistry and Chemical Engineering*, Stanford University, Dec. 3-5, 1986.
T. E. Attwood et al. (1988), "Synthesis and Properties of Polyaryletherketones", *Polymer*, vol. 22, pp. 1097-1103.
Xigao Jin et al., "A Sulphonated Poly(aryletherketone)", *British Polymer Journal*, vol. 17, #1, 1-10 (1985).

*Primary Examiner*—John Kight, III.
*Assistant Examiner*—P. Hampton Hightower

[57] ABSTRACT

The present invention relates to a process for the production of an article comprising a polymer itself comprising poly(etheretherketone), which process comprises:

A. contacting poly(etheretherketone) with at least one organic compound, consisting essentially of carbon and hydrogen, and optionally oxygen, nitrogen, sulfur, halogen, or mixtures thereof having a molecular weight of between about 160 and 450 daltons and having at least one six membered aromatic ring structure, which compound is stable at a temperature of between 240° and 400° C. at ambient pressure, at a temperature of between about 240° and 400° C. at ambient pressure for a time effective to dissolve greater than about 10 percent by weight of the poly(etheretherketone) present;

B. forming the solution of poly(etheretherketone) and solvent of step (A) into a desired article configuration;

C. removing the solvent; and

D. recovering the article comprising poly(etheretherketone) formed thereby. PEEK is a useful material for articles needing high temperature and solvent resistant properties. PEEK is also useful in the formation of membranes, hollow fibers and solid fibers which are porous, permeable, semipermeable or selectively permeable.

30 Claims, 1 Drawing Sheet

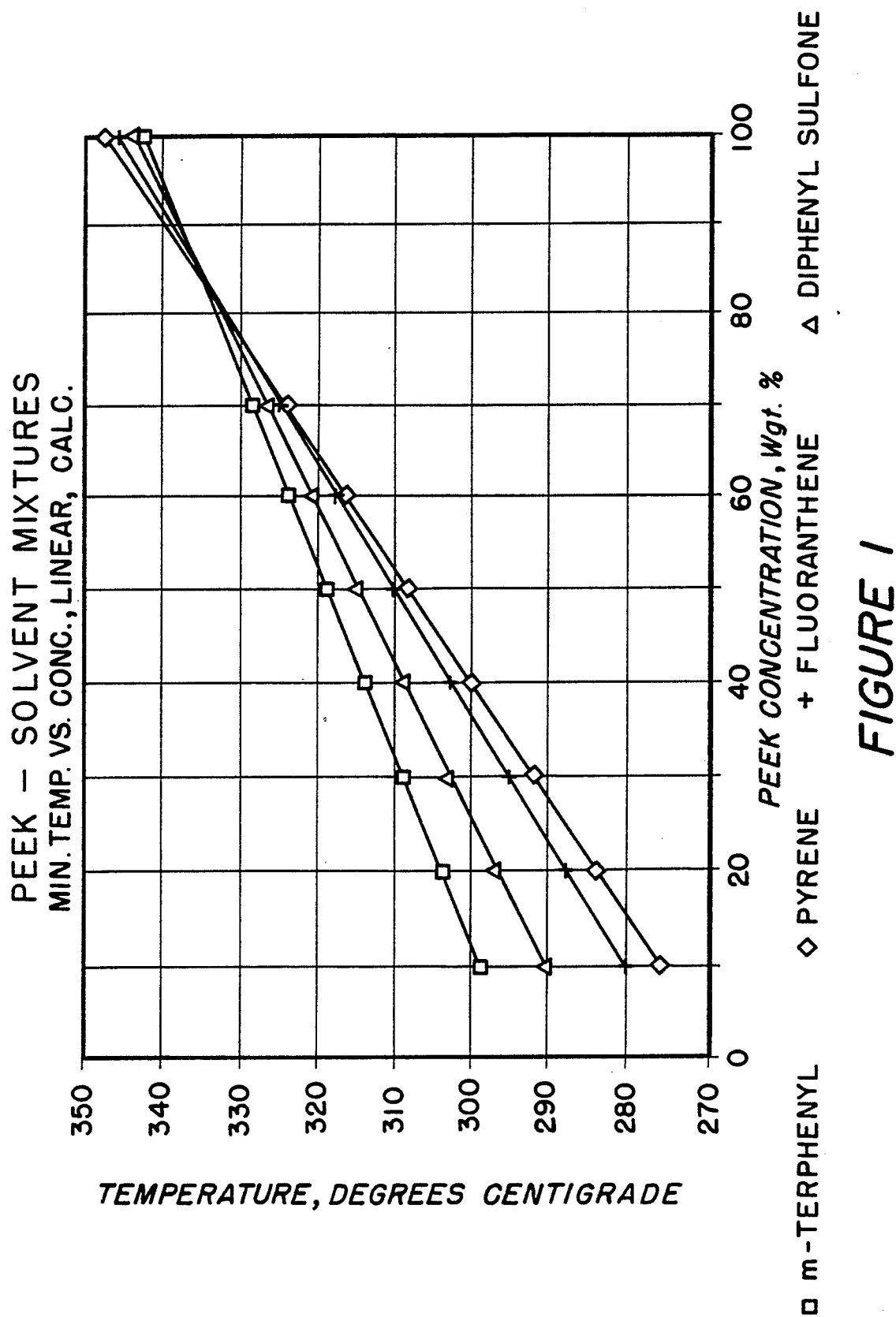

PROCESS FOR FORMING AN ARTICLE COMPRISING POLY(ETHERETHERKETONE) (PEEK) TYPE POLYMERS

BACKGROUND OF THE INVENTION

1. Field of the Invention

The present invention relates to a process for the solubilizing of a high melting polymer so that the solubilized polymer can be formed into a desirable shape. More specifically, the present invention relates to the solution at temperatures of between about 240° to 400° C. of poly(etheretherketone) type polymers using organic compounds generally having a high boiling point, forming the solubilized polymer into a shape, removing the organic compound(s) and recovering the shaped article.

2. Description of Related Art

Poly(etheretherketone) is a very useful recently developed high temperature polymeric material. The properties of commercially available PEEK include:

1. A relatively high glass transition temperature of about 144° C.,
2. A very high crystallized melting point of about 341° C.,
3. Thermal stability, and
4. High solvent resistance.

Unfortunately, these properties make PEEK a very difficult polymer to mold into desirable useful shaped articles. Specifically, the thermal stability and solvent resistance make PEEK an ideal candidate for ultrafiltration and microfiltration membranes, hollow fibers, said fibers and the like. However, the very useful thermal and solvent resistance of PEEK often presents severe problems in shaping the polymer into a desired useful form.

Formation of articles of manufacture from PEEK requires special solvents for the polymers. Generally, PEEK is advertised as being insoluble in all common solvents and, being crystalline, has excellent resistance to a very wide range of organic and inorganic liquids.

Most of the art describes simple relatively low boiling solvents used to dissolve the monomers to prepare the PEEK. Once PEEK is formed, it usually separates from the polymerization solvent(s).

The art includes for example:

H. A. Smith in U.S. Pat. No. 4,118,363 discloses that diphenyl ether is used as a high boiling solvent for high molecular weight solvent resistant crystalline polymers, such as poly(phenylene sulfide). Further, the alkyl-substituted and halogen-substituted diphenyl ethers are useful high boiling solvents for poly(phenylene sulfide). Diphenyl sulfone (molecular weight 218, melting point 124° C., boiling point 379° C.), dissolves about 70% of PEEK polymer at 380°–390° C. (in excess of the boiling point).

1-Chloronaphthalene (molecular weight 162, melting point −20° C., boiling point 258° C.) and benzophenone (molecular weight 182, melting point 50° C., boiling point 305° C.) are suggested as solvents. However, the useful solvent abilities are somewhat restricted by their relatively low boiling points.

Concentrated sulfuric acid, chlorosulfonic acid or trifluoromethanesulfonic acid are other "good" solvents for PEEK. However, the treatment of PEEK with these strong acids, usually at elevated temperatures, may result in a "new" sulfonated polymer, which is soluble in the solvent acid, and is completely different from the original polymeric PEEK.

It is not possible a priori to determine those organic compounds which will be useful as solvents to produce useful articles comprising PEEK. It is therefor extremely useful to have performed a large number of experiments to determine those solvents which are useful to dissolve (or to solubilize) PEEK.

None of the above references individually or in combination teach or suggest the use of a number of high boiling solvents comprising organic compounds to solubilize poly(etheretherketone), forming the solubilized poly(etheretherketone) into the shape of an article of manufacture, removing the solvent and recovering the article of poly(etheretherketone).

SUMMARY OF THE INVENTION

In one aspect, the present invention relates to a process for the production of an article comprising polymer itself comprising a poly(etheretherketone) - type polymer, which process comprises:

A. contacting a poly(etheretherketone) type polymer with at least one organic compound, consisting essentially of carbon and hydrogen and optionally oxygen, nitrogen, sulfur, halogen, or mixtures of these atoms, wherein said at least one organic compound has a molecular weight of between about 160 and 450 daltons and has at least one six membered aromatic ring structure, which compound is stable at a temperature of between about 240° and 400° C. at ambient pressure, at a temperature of between about 240° and 400° C. at ambient pressure for a time effective to dissolve greater than about 10% by weight of the poly(etheretherketone) present;

B. forming the solution of poly(etheretherketone) - type polymer and the organic compound of Step (A) into a desired article configuration;

C. removing the at least one organic compound; and

D. recovering the article comprising poly(etheretherketone) - type polymer formed thereby.

In another aspect, the present invention relates to the article of poly(etheretherketone) type polymer produced by the aforementioned process, particularly where the article is porous, permeable, semi-permeable or selectively permeable.

BRIEF DESCRIPTION OF THE FIGURE

FIG. 1 shows a composite of temperature at ambient pressure at which a specific weight percent of PEEK polymer will dissolve in solvents: m-terphenyl, pyrene, fluoranthene and diphenyl sulfone. Any combination of temperature and polymer concentration above each line represents homogenous, soluble, one phase mixtures. Similarly any combination below each line represents insoluble multiphase mixtures.

DETAILED DESCRIPTION OF THE INVENTION AND PREFERRED EMBODIMENTS

Definitions

As used herein:

"Article" refers to any type of article of manufacture which can be formed from a polymeric material. Preferably, the article is a sheet, membrane, hollow or solid fiber. These articles, when permeable, semi-permeable, or selectively permeable, can be used in the separation of various materials. The potential utility of such a membrane article depends upon the membrane material, its structure (which depends upon its mode of preparation), and the mode in which it is operated. For example, such articles can be used to separate mixtures of gases, e.g. oxygen and nitrogen, to separate solutes from solutions, e.g. soluble waste materials from blood (hemodialysis) or salt from seawater (reverse osmosis desalination), or to separate dissolved molecules, colloids, and suspended solids from smaller molecules, e.g. in the manufacture of latex or cheese (ultrafiltration). Such membranes, their mechanisms of transport and preparation, their structures, and examples are discussed at length in many references. The following four discussions are herein incorporated as references with the additional references therein: (a) "Membrane Technology" by D. R. Paul and G. Morel in "Kirk-Othmer Encyclopedia of Chemical Technology", M. Grayson and D. Eckroth, editors, John Wiley & Sons, New York, 3rd edition, Vol. 15, pages 92-131 (1981); (b) "Ultrafiltration", by P. R. Klinkowski, ibid, Vol. 23, pages 439-461 (1983); (c) "Synthetic Polymeric Membranes, A Structural Perspective", by R. E. Kesting, John Wiley & Sons, New York, 2nd edition, 1985; and (d) "Materials Science of Synthetic Membranes", D. R. Lloyd, editor, American Chemical Society, Washington, D.C. ACS Symposium Series No. 269, 1985).

"Forming the article" refers to the shaping of the hot pliable poly(etheretherketone)/solvent (organic compound) mixture into a desired article configuration. The forming may be accomplished by solution casting, extruding, pressure molding, blow molding, or any of the convention methods used in the art to shape a flexible polymer.

"Halogen", refers to fluorine, chlorine, bromine, iodine or mixtures of these atoms, generally as is found as a substituent in an organic molecule. Generally, chlorine, bromine and/or fluorine as atoms are preferred.

"Organic compound" refers to those organic materials consisting of carbon and hydrogen having a molecular weight of between about 160 and 450 daltons and having at least one six membered aromatic ring structures. This includes organic compounds such as triphenylmethane, pyrene, terphenyl, and the like. It also includes those compounds which further include oxygen, nitrogen, sulfur, halogen or mixtures of these atoms. Heteroaromatic compounds having molecular weights of between about 160 and 450 daltons are also included.

"Poly(etheretherketone)" or "PEEK" refers to a polymeric material which comprises poly(etheretherketone), i.e., [poly(oxy-p-phenyleneoxy-p-phenylenecarbonyl-p-phenylene]. Other similar polymeric (PEEK-type polymers) materials such as poly(aryletherketone) (PAEK), poly(etherketone) (PEK), or poly(etherketoneketone) (PEKK), may also be polymers within this invention. Further, poly(etheretheretherketone) (PEEEK), poly(etheretherketoneetherketone) (PEEKEK), poly(etheretherketoneketone) (PEEKK), poly etherketoneetherketoneketone) (PEKEKK) are also to be considered as PEEK-type polymers, both individually and as mixtures and as copolymers with each other. Polymer mixtures of these PEEK-type polymers with poly(phenylene sulfide) are also contemplated within the present invention.

"PEEK-type" refers to poly(etheretherketone)-like polymers, poly(phenylenesulfide)-type polymers or mixtures or copolymers of these amorphous polymers within the present invention.

"Phenyl" or "phenylene" refers to the following structures:

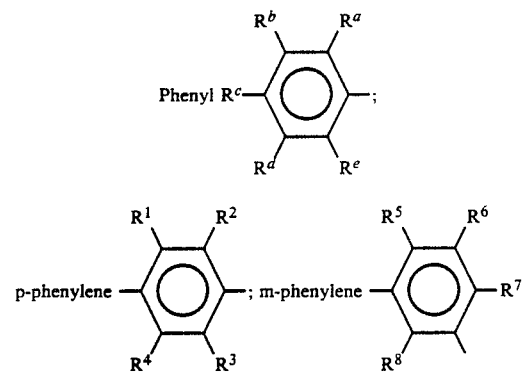

wherein Ra, Rb, Rc, Rd, Re and Rl to are each independently selected from hydrogen, methyl, ethyl, propyl, butyl, fluorine, chlorine or bromine.

These structures may be found as part of the PEEK-like, PEEK-type, PPS, PPS-like, and PPS-type polymer structures described herein. Thus, a poly(phenylene sulfide)-type structure may have as a structure poly(2-chlorophenylene sulfide) or poly (2-methylphenylene sulfide). Also, a PEEK-type structure may include [poly (oxy-p-(2-chlorophenyleneoxy)-p-(2-methylphenylene-carbonyl)-p-phenylene)]. Usually, the p-phenylene is preferred wherein at least two groups of $R^1$ to $R^4$ are hydrogen and the other two groups are each independently selected from methyl, ethyl, propyl, butyl, fluorine, chlorine or bromine. Expecially preferred is p-phenylene where three of the groups $R^1$ and $R^4$ are hydrogen and the remaining group is independently selected from methyl, ethyl, propyl, butyl, fluorine, chlorine or bromine.

The method of combining the crystalline polymer with the organic compound(s) as a solvent (solubilizing agent) medium is not generally critical to the process of the present invention. The combination may be conveniently prepared by mixing, stirring, extrusion, gear pumps, rotary mixers, static mixers, or other means well known in polymer, membrane, and mixing technologies.

The pressure and composition of the atmosphere above the polymer and organic compound in the practice of this invention is not critical. Generally ambient pressure is used. In some cases, above atmospheric pressure is possible, particularly if higher temperatures than the boiling point of the organic compound is desired. Preferably, the atmosphere above the polymer and organic compound is essentially inert to prevent undesirable side reactions of any of the components. Nitrogen and helium are useful inert atmospheres.

The dissolution of PEEK in a given solvent is a function of the polymer concentration and the temperature. FIG. 1 shows solubility curves for four typical solvents for PEEK (m-terphenyl, pyrene, fluoranthene, and diphenyl sulfone). Any temperature-concentration combination above each curve represents a homogenous one phase composition; any combination below each curve represents a multiphase mixture in which the polymer is not completely soluble. Thus, for example, a mixture of 40% PEEK in diphenyl sulfone requires a temperature in excess of about 308° C for complete dissolution to be achieved. Similarly 50% PEEK in m-terphenyl requires a temperature in excess of about 319° C for complete solubility to occur.

It is useful to prepare films, fibers, and the like of PEEK using a mixture of an organic compound as a solvent in combination with a non-solvent or a poor solvent. Thus, if a solvent and a nonsolvent are combined at an elevated temperature and are mutually soluble in each other, when the PEEK is added, the PEEK will dissolve. The solvent/nonsolvent combination is extremely useful in the production of porous membranes of PEEK. Typically a solution for preparing hollow fiber membranes might consist of about 50 weight percent PEEK with the remainder consisting of the solvent, solvent/nonsolvent, or solvent/poor solvent mixture. The ratio of solvent to nonsolvent or poor solvent typically might vary from about 1.5/1 to about 4.0/1 depending upon the relative solvent power of the solvent and the nonsolvent. The preparation of film membranes would typically require solutions more dilute in polymer concentration.

The organic compounds or mixtures thereof are essentially inert to the PEEK - type polymers at elevated temperatures. The article of PEEK - type polymers obtained should have essentially the same composition as the starting PEEK - type polymer.

In this application, a solvent is defined as dissolving about 10% by weight or more of the PEEK-type polymer at a specific temperature. Preferably solution of PEEK greater than about 25% by weight of the PEEK-type polymer is obtained. In an especially preferred embodiment, greater than about 50 percent by weight of polymer is dissolved.

In another aspect, the article of PEEK may contain trace quantities of the organic compound(s) used as solvents. These traces (about 0.1-5 percent by weight) are useful in determining whether or not the solvents of the present invention have been used for the PEEK article of manufacture.

It is to be understood that various materials, such as fillers, additives, antioxidants, pigments, dyes, inhibitors and the like can be dissolved or dispersed with the PEEK solubilized by the practice of this invention. These materials are present to improve the processing as to provide specific physical and/or chemical properties of the final polymer article. Such materials are described, for example in detail, by R. Gachter and H. Muller in "Plastics Additives Handbook", 2nd edition, published by Hanser Publishers, Munich, in 1983.

Generally the polymer/solvent mixture is shaped into a hollow fiber by techniques well known in the art. Such techniques are described by Israel Cabasso in "Hollow Fiber Membranes" in Kirk-Othmer "Encyclopedia of Chemical Technology", Vol. 12, pages 492–517, John Wiley and Sons, New York, 3rd edition, (1980), M. Grayson and D. Eckroth, editors. The solvent/polymer mixture may also be solvent cast on a flat surface; the solvent is removed by evaporation and/or reduced pressure or by using a liquid which dissolves the solvent but not the polymer. The membrane which typically has a thickness of between about 0.2 and 50 mils is porous and is useful in separation devices, such as for ultrafiltration.

The following Examples are to be construed as being illustrative and are not to be construed as being limiting in any way.

EXAMPLE 1

Poly(etheretherketone) is obtained from ICI Americas, Inc., Wilmington, Del. It is designated as Grade 150P. The PEEK is dried at 150° C. for 16 hr in an air-circulating oven and is stored in a desiccator over Drierite. Most of the organic compounds examined as high temperature solvents were obtained from Aldrich Chemical Company and were used as received. Other organic chemicals were obtained from suppliers as listed in Chemical Sources, published annually by Directories Publishing Co., Inc., of Columbia, S.C.

Mixtures of PEEK and solvent, a total weight of less than about 2g, are prepared by weighing PEEK and solvent to a precision of ±0.0001 g in a 1 to 4 dram size glass vial. The resulting air space in each vial, which varies considerably due to the large differences in the bulk densities of the compounds, is purged with nitrogen. The vials are sealed with screw caps containing aluminum foil liners. Solubility is determined usually at about 10 weight percent polymer, followed by additional determinations at about 25 and 50 weight percent if necessary.

In the following tables, in the solubility column, "g" is Z greater than (>), and "s" is smaller or less than (<), and = is equal to.

Table 1 below lists the organic compounds examined for their solvent effect on PEEK. The approximate solubility of each polymer is shown at the indicated temperature(s). Compounds were assigned a number (beginning with 200) for easy reference. Also listed in Table 1 is an approximate molecular weight, melting point, and boiling point, if these physical properties were available.

TABLE 1

RELATIVE SOLUBILITY OF POLYETHER-ETHERKETONE, (PEEK), IN VARIOUS ORGANIC COMPOUNDS

| Ref. No. | Compound | Molec. Weight | Melting Point | Boiling Point | Approximate Solub. (g = >; s = <) | Temp. (°C.) |
|---|---|---|---|---|---|---|
| 200 | Triphenylmethanol | 260 | 161 | 360 | g 50.1%? | 349 |
| 201 | Triphenylmethane | 244 | 93 | 359 | g 50.2% | 349 |
| 202 | Triphenylene | 228 | 196 | 438 | g 50.0% | 350 |
| 203 | 1,2,3-Triphenylbenzene | 306 | 158 | — | g 50.1% | 349 |
| 204 | 1,3,5-Triphenylbenzene | 306 | 173 | 460 | s 9.9% | 349 |
| 205 | Tetraphenylmethane | 320 | 281 | 431 | =s 10.7% | 349 |
| 206 | Tetraphenylsilane | 337 | 236 | 422 | s 10.1% | 349 |
| 207 | Diphenyl sulfoxide | 202 | 70 | 350 | s 10.5%a | 349 |
| 208 | Diphenyl sulfone | 218 | 124 | 379 | g 50.0% | 349 |
| 209 | 2,5-Diphenyloxazole | 221 | 72 | 360 | g 50.0% | 349 |
| 210 | Diphenic acid | 242 | 228 | — | g 25.1%?a | 349 |
| 211 | 1,1-Diphenylacetone | 210 | 60 | — | s 10.0% | 302 |
| 212 | 1,3-Diphenylacetone | 210 | 33 | 330 | s 10.1% | 302 |
| 213 | 4-Acetylbiphenyl | 196 | 117 | — | s 10.3% | 302 |

TABLE 1-continued
RELATIVE SOLUBILITY OF POLYETHER-ETHERKETONE, (PEEK), IN VARIOUS ORGANIC COMPOUNDS

| Ref. No. | Compound | Molec. Weight | Melting Point | Boiling Point | Approximate Solub. (g = >; s = <) | Temp. (°C.) |
|---|---|---|---|---|---|---|
| 214 | 2-Biphenylcarboxylic acid | 198 | 109 | 349 | g 50.1% | 349 |
| 215 | 4-Biphenylcarboxylic acid | 198 | 225 | — | g 10.0% | 349 |
| 215 | 4-Biphenylcarboxylic acid | 198 | 225 | — | =g 50.1%? | 349 |
| 216 | m-Terphenyl | 230 | 83 | 379 | g 50.2% | 349 |
| 216 | m-Terphenyl | 230 | 83 | 379 | s 5.0% | 302 |
| 217 | 4-Benzoylbiphenyl | 258 | 100 | 419 | g 50.1% | 349 |
| 217 | 4-Benzoylbiphenyl | 258 | 100 | 419 | s 5.2% | 302 |
| 218 | 4,4-Diphenyl-benzophenone | 334 | — | — | s 10.4% | 302 |
| 219 | 1-Benzoyl-4-piperidone | 203 | 56 | 399 | g 9.8%?a | 349 |
| 220 | 2-Benzoylnaphthalene | 232 | 81 | 383 | g 49.9% | 349 |
| 221 | Diphenyl carbonate | 214 | 79 | 301 | s 10.1% | 302 |
| 222 | Bibenzyl | 182 | 51 | 284 | s 10.3% | 274 |
| 223 | Diphenyl methyl phosphate | 264 | — | 389 | s 10.0%a | 349 |
| 224 | 1-Bromonaphthalene | 207 | −1 | 280 | s 9.8% | 274 |
| 225 | N,N-Diphenylformamide | 197 | 71 | 337 | g 9.9% | 302 |
| 225 | N,N-Diphenylformamide | 197 | 71 | 337 | s 25.2% | 302 |
| 226 | 3-Phenoxybenzyl alcohol | 200 | — | 329 | g 24.7% | 302 |
| 226 | 3-Phenoxybenzyl alcohol | 200 | — | 329 | s 49.9% | 302 |
| 227 | Fluoranthene | 202 | 108 | 384 | g 50.0% | 349 |
| 228 | 2-Phenoxybiphenyl | 246 | 49 | 342 | s 10.9% | 302 |
| 229 | Triphenyl phosphate | 326 | 51 | 281 | s 9.9% | 274 |
| 230 | Cyclohexyl phenyl ketone | 188 | 56 | — | s 9.9% | 302 |
| 231 | 2,5-Diphenyl-1,3,4-oxadiazole | 222 | 139 | 382 | g 49.9% | 349 |
| 232 | 1,4-Dibenzoylbutane | 266 | 107 | — | s 10.0% | 302 |
| 233 | 9-Fluorenone | 180 | 83 | 342 | g 24.9% | 302 |
| 233 | 9-Fluorenone | 180 | 83 | 342 | s 50.0% | 302 |
| 234 | 1,2 Dibenzoyl benzene | 286 | 146 | — | g 50.2% | 349 |
| 235 | Dibenzoylmethane | 224 | 78 | 360 | g 50.4% | 349 |
| 236 | 2,4,6-Trichlorophenol | 197 | 65 | 246 | s 9.0% | 240 |
| 237 | Benzil | 210 | 94 | 347 | g 10.2% | 302 |
| 237 | Benzil | 210 | 94 | 347 | s 25.0% | 302 |
| 238 | p-Terphenyl | 230 | 212 | 389 | s 9.8% | 302 |
| 238 | p-Terphenyl | 230 | 212 | 389 | g 50.0% | 349 |
| 239 | Anthracene | 178 | 216 | 340 | g 10.0% | 302 |
| 239 | Anthracene | 178 | 216 | 340 | s 24.7% | 302 |
| 240 | Mineral oil | — | — | 360 | s 10.7% | 349 |
| 241 | Butyl stearate | 341 | — | 343 | s 10.0% | 302 |
| 242 | 9-Phenylanthracene | 254 | 151 | 417 | g 10.4%?a | 349 |
| 243 | 1-Phenylnaphthalene | 204 | — | 324 | g 9.9% | 302 |
| 243 | 1-Phenylnapthalene | 204 | — | 324 | s 25.0% | 302 |
| 244 | 4-Phenylphenol | 170 | 166 | 321 | g 25.8% | 297 |
| 244 | 4-Phenylphenol | 170 | 166 | 321 | s 50.0% | 302 |
| 244 | 4-Phenylphenol | 170 | 166 | 321 | g 50.0% | 304 |
| 245 | 2-Phenylphenol | 170 | 59 | 282 | s 10.2% | 274 |
| 246 | 1-Ethoxynaphthalene | 172 | — | 280 | s 10.2% | 274 |
| 247 | Phenyl benzoate | 198 | 69 | 298 | s 9.8% | 274 |
| 248 | 1-Phenyldecane | 218 | — | 293 | s 10.2% | 274 |
| 249 | 1-Methoxynaphthalene | 158 | — | 269 | s 10.0% | 240 |
| 250 | 2-Methoxynaphthalene | 158 | 74 | 274 | s 9.4% | 240 |
| 251 | Sulfuric acid, concentrated | 98 | 11 | 340 | g 20.3% | 150 |
| 252 | 4-Bromobiphenyl | 233 | 86 | 310 | g 5.2% | 300 |
| 252 | 4-Bromobiphenyl | 233 | 86 | 310 | s 24.8% | 302 |
| 252 | 4-Bromobiphenyl | 233 | 86 | 310 | s 5.2% | 241 |
| 253 | 4-Bromodiphenyl ether | 249 | 18 | 305 | =g 5.4% | 300 |
| 253 | 4-Bromodiphenyl ether | 249 | 18 | 305 | s 24.8% | 302 |
| 253 | 4-Bromodiphenyl ether | 249 | 18 | 305 | s 5.4% | 241 |
| 254 | 1,3-Diphenoxybenzene | 262 | 60 | — | =s 5.4%a | 300 |
| 254 | 1,3-Diphenoxybenzene | 262 | 60 | — | s 5.4%a | 241 |
| 255 | 1,8-Dichloroanthraquinone | 277 | 202 | — | g 5.3%a | 300 |
| 255 | 1,8-Dichloroanthraquinone | 277 | 202 | — | s 5.3%a | 241 |
| 256 | 9,10-Dichloroanthracene | 247 | 214 | — | s 5.5%a | 300 |
| 257 | 4,4'-Dibromobiphenyl | 312 | 170 | 355 | s 5.2% | 241 |
| 257 | 4,4'-Dibromobiphenyl | 312 | 170 | 355 | g 5.2% | 300 |

TABLE 1-continued
RELATIVE SOLUBILITY OF POLYETHER-ETHERKETONE, (PEEK), IN VARIOUS ORGANIC COMPOUNDS

| Ref. No. | Compound | Molec. Weight | Melting Point | Boiling Point | Approximate Solub. (g = >; s = <) | Temp. (°C.) |
|---|---|---|---|---|---|---|
| 257 | 4,4'-Dibromobiphenyl | 312 | 170 | 355 | s 25.1% | 302 |
| 257 | 4,4'-Dibromobiphenyl | 312 | 170 | 355 | g 50.1% | 349 |
| 258 | Benzophenone | 182 | 50 | 305 | s 11.3% | 241 |
| 258 | Benzophenone | 182 | 50 | 305 | =g 11.3% | 300 |
| 259 | Benzophenone | 182 | 50 | 305 | s 24.9% | 302 |
| 259 | Polyphosphoric acid | — | — | — | s 4.8%a | 300 |
| 260 | 1-Chloronaphthalene | 162 | −20 | 258 | s 9.9% | 241 |
| 261 | Diphenyl ether | 170 | 27 | 259 | s 10.1% | 241 |
| 262 | 1-Cyclohexyl-2-pyrrolidinone | 167 | — | 302 | =s 10.0%a | 300 |
| 263 | 1-Benzyl-2-pyrrolidinone | 175 | — | — | g 14.9% | 302 |
| 263 | 1-Benzyl-2-pyrrolidinone | 175 | — | — | s 32.9% | 302 |
| 264 | o,o'-Biphenol | 186 | 109 | 315 | s 5.1% | 221 |
| 264 | o,o'-Biphenol | 186 | 109 | 315 | g 9.8% | 302 |
| 264 | o,o'-Biphenol | 186 | 109 | 315 | s 25.0% | 302 |
| 265 | HB-40 (hydrogenated terphenyl)* | 244 | —. | 325 | s 9.9% | 302 |
| 266 | Dioctyl phthalate | 391 | −50 | 384 | s 10.8% | 349 |
| 267 | 5-Chloro-2-benzoxazolone | 170 | 191 | — | s 10.2%a | 349 |
| 268 | Dibenzothiophene | 184 | 98 | 332 | g 10.3%?b? | 302 |
| 269 | Bis(4-chlorophenyl sulfone) | 287 | 146 | 412 | s 15.3% | 349 |
| 270 | Diphenyl phthalate | 318 | 75 | — | g 50.0% | 349 |
| 271 | 2,6-Diphenylphenol | 246 | 101 | — | g 50.0% | 349 |
| 272 | Diphenyl sulfide | 186 | −40 | 296 | s 9.0% | 274 |
| 273 | Diphenyl chlorophosphate | 269 | — | 360 | s 9.9% | 349 |
| 274 | Fluorene | 166 | 113 | 298 | s 10.1% | 274 |
| 275 | Phenanthrene | 178 | 100 | 340 | g 10.0% | 302 |
| 275 | Phenanthrene | 178 | 100 | 340 | s 25.0% | 302 |
| 276 | Sulfolane | 120 | 27 | 285 | s 10.1% | 274 |
| 277 | Methyl myristate | 242 | 18 | 323 | s 8.2% | 302 |
| 278 | Methyl stearate | 299 | 38 | 358 | s 10.1% | 349 |
| 279 | Phenothiazine | 199 | 182 | 371 | g 49.9% | 349 |
| 280 | Hexadecane | 226 | 19 | 288 | s 10.0% | 274 |
| 281 | Dimethyl phthalate | 194 | 2 | 282 | s 10.0% | 274 |
| 282 | Tetraethylene glycol dimethyl ether | 222 | −30 | 275 | s 9.6% | 240 |
| 283 | Diethylene glycol dibutyl ether | 218 | −60 | 256 | s 9.6% | 240 |
| 284 | Docosane | 311 | 44 | 369 | s 10.4% | 349 |
| 285 | Eicosane | 283 | 37 | 340 | s 7.9% | 302 |
| 286 | Dotriacontane | 451 | 70 | 476 | s 10.4% | 349 |
| 287 | 2,7-Dimethoxy-naphthalene | 188 | 138 | — | g 10.0%ab | 349 |
| 288 | 2,6-Dimethoxy-naphthalene | 188 | 153 | — | g 10.8%b | 349 |
| 289 | o-Terphenyl | 230 | 58 | 337 | s 9.9% | 302 |
| 290 | 4,4'-Dimethoxy-benzophenone | 242 | 142 | — | g 50.0% | 349 |
| 291 | 9,10-Diphenyl-anthracene | 330 | 246 | — | g 50.0% | 349 |
| 292 | 1,1-Diphenylethylene | 180 | 6 | 270 | s 9.7% | 240 |
| 293 | epsilon-Caprolactam | 113 | 71 | 271 | s 10.0% | 240 |
| 294 | Tetraphenylethylene | 332 | 223 | 420 | s 10.9% | 302 |
| 295 | Pentafluorophenol | 184 | 35 | 143 | s 9.9% | 140 |
| 295 | Pentafluorophenol | 184 | 35 | 143 | s 5.0% | 141 |
| 296 | Thianthrene | 216 | 158 | 365 | s 10.2% | 302 |
| 298 | Pentachlorophenol | 266 | 189 | 310 | g 25.0% | 302 |
| 298 | Pentachlorophenol | 266 | 189 | 310 | s 50.6% | 302 |
| 299 | Pyrene | 202 | 150 | 404 | g 50.0% | 347 |
| 300 | Benzanthrone | 230 | 169 | — | s 25.5%ab | 328 |
| 301 | 9,9'-Bifluorene | 330 | 247 | — | g 25.2% | 327 |
| 301 | 9,9'-Bifluorene | 330 | 247 | — | s 50.2% | 318 |
| 301 | 9,9'-Bifluorene | 330 | 247 | — | g 50.2% | 327 |
| 302 | Santowax R* Chem. Abstr. #26140-60-3 | — | 145 | 364 | g 60.0% | 347 |
| 303 | Therminol 66* Chem. Abstr. #61788-32-7 | 240 | — | 340 | g 50.1% | 337 |
| 304 | Therminol 75* Chem Abstr. #26140-60-3 | — | 70 | 385 | g 24.9% | 325 |

TABLE 1-continued
RELATIVE SOLUBILITY OF POLYETHERETHERKETONE, (PEEK), IN VARIOUS ORGANIC COMPOUNDS

| Ref. No. | Compound | Molec. Weight | Melting Point | Boiling Point | Approximate Solub. (g = >; s = <) | Temp. (°C.) |
|---|---|---|---|---|---|---|
| | Chem Abstr. #217-59-4 | | | | | |
| 304 | Therminol 75* | — | 70 | 385 | g 50.3% | 332 |
| 305 | 1-Phenyl-2-pyrrolidinone | 161 | 68 | 345 | g 10.1% | 279 |
| 305 | 1-Phenyl-2-pyrrolidinone | 161 | 68 | 345 | g 25.5% | 290 |
| 305 | 1-Phenyl-2-pyrrolidinone | 161 | 68 | 345 | g 50.0% | 317 |
| 306 | 4,4'-Isopropylidenediphenol | 228 | 156 | 402 | =g 50.0% | 301 |
| 306 | 4,4'-Isopropylidenediphenol | 228 | 156 | 402 | g 50.0% | 318 |
| 307 | 4,4'-Didihydroxybenzophenone | 214 | 214 | — | s 10.0% | 301 |
| 307 | 4,4'-Dihydroxybenzophenone | 214 | 214 | — | g 25.0% | 310 |
| 307 | 4,4'-Dihydroxybenzophenone | 214 | 214 | — | s 50.0% | 319 | a = Black or very dark color
b = reacts?
*Monsanto Company

Table 2 below illustrates those organic compounds which dissolve at least 50 weight percent of PEEK at 349° C.

TABLE 2
ORGANIC COMPOUNDS WHICH DISSOLVE AT LEAST 50 WEIGHT PERCENT OF PEEK AT 349° C.

| Ref. No. | Compound | Approximate Solub. (g = >; s = <) |
|---|---|---|
| 279 | Phenothiazine | g 49.9% |
| 220 | 2-Benzoylnaphthalene | g 49.9% |
| 231 | 2,5-Diphenyl-1,3,4-oxadiazole | g 49.9% |
| 271 | 2,6-Diphenylphenol | g 50.0% |
| 290 | 4,4'-Dimethoxybenzophenone | g 50.0% |
| 208 | Diphenyl sulfone | g 50.0% |
| 209 | 2,5-Diphenyloxazole | g 50.0% |
| 227 | Fluoranthene | g 50.0% |
| 291 | 9,10-Diphenylanthracene | g 50.0% |
| 270 | Diphenyl phthalate | g 50.0% |
| 238 | p-Terphenyl | g 50.0% |
| 202 | Triphenylene (at 350° C.) | g 50.0% |
| 214 | 2-Biphenylcarboxylic acid | g 50.1% |
| 257 | 4,4'-Dibromobiphenyl | g 50.1% |
| 203 | 1,2,3-Triphenylbenzene | g 50.1% |
| 217 | 4-Benzoylbiphenyl | g 50.1% |
| 200 | Triphenylmethanol | g 50.1%? |
| 201 | Triphenylmethane | g 50.2% |
| 234 | 1,2-Dibenzoylbenzene | g 50.2% |
| 216 | m-Terphenyl | g 50.2% |
| 235 | Dibenzoylmethane | g 50.4% |
| 215 | 4-Biphenylcarboxylic acid | =g 50.1%? |
| 299 | Pyrene (at 347° C.) | g 50.0% |
| 305 | 1-Phenyl-2-pyrrolidinone (at 317° C.) | g 50.0% |
| 306 | 4,4'-Isopropylidenediphenol (at 318° C.) | g 50.0% |
| 301 | 9,9'-Bifluorene (at 327° C.) | g 50.2% |
| 302 | Santowax (Monsanto, @347° C.) | g 60.0% |
| 303 | Therminol 66 (Monsanto, @337° C.) | g 50.1% |
| 304 | Therminol 75 (Monsanto, @332° C.) | g 50.3% |

EXAMPLE 2

Solution of Peek in a Solvent/Non Solvent Mixture (a) Similarly, the process as described above in Example 1 for the solution of PEEK is repeated except that the solvent is replaced by an equivalent weight of a mixture of solvent/non-solvent (90/10 percent by weight). The solution is solvent cast, and the solvent/non-solvent is removed in a vacuum to produce a porous membrane having a thickness of 20 mil.

While only a few embodiments of the invention have been shown and described herein, it will become apparent to those skilled in the art that various modifications and changes can be made in the process and selection of organic compounds and their mixtures used in the high temperature solubilization of PEEK to form useful articles without departing from the spirit and scope of the present invention. All such modifications and changes coming within the scope of the appended claims are intended to be covered thereby.

I claim:

1. A process for the production of an article comprising a polymer itself comprising poly(etheretherketone), which process comprises:

A. contacting a polymer comprising poly(etheretherketone), with at least one organic compound, consisting essentially of carbon atoms and hydrogen atoms, and optionally oxygen atoms, nitrogen atoms, sulfur atoms, halogen atoms, or mixtures thereof, having a molecular weight of between about 160 and 450 daltons and having at least one six membered aromatic ring structure which compound is stable at a temperature of between 240° and 400° C. at ambient pressure, at a temperature of between about and 240° and 400° C. at ambient pressure for a time effective to dissolve greater than about 10% by weight of the poly(etheretherketone) present;

B. forming the solution of poly(etheretherketone) and organic compound of step (A) into a desired article configuration;

C. removing the organic compound; and

D. recovering the article comprising poly(etheretherketone) formed thereby.

2. The process of claim 1 wherein the at least one organic compound has a molecular weight of between about 175 and 350 daltons, and with the proviso that when the organic compound contains oxygen, the organic compound is not diphenyloxide or a substituted diphenyl oxide.

3. The process of claim 2 wherein in Step (A) the at least one organic compound is at a temperature of between about 270° and 375° C.

4. The process of claim 3 wherein in Step (A) the at least one organic compound is at a temperature of between about 270° and 350° C.

5. The process of claim 4 wherein the organic compound dissolves greater than 25% by weight of poly(etheretherketone).

6. The process of claim 5 wherein the time effective for the PEEK to dissolve in the at least one organic compound is between about 5 and 120 minutes.

7. The process of claim 5 wherein the temperature of solution is about 320° C.

8. The process of claim 2 wherein the at least one organic compound is selected from: 2,5-diphenyl-1,3,4-oxadiazole; 2-benzoylnaphthalene; diphenyl sulfone; fluoranthene; 9,10-diphenylanthracene; p-terphenyl; 4,4'-dimethoxybenzophenone; 2,6-diphenylphenol; 2,5-diphenyloxazole; diphenyl phthalate; triphenylene; 4,4'-dibromobiphenyl; 4-benzoylbiphenyl; 2-biphenylcarboxylic acid; 1,2,3-tiphenrylbenzene; tirphenylmethanol; m-terphenyl; triphenylmethane; 1,2-dibenzoylbenzene; dibenzoylmethane; 4-biphenylcarboxylic acid; 1-phenyl-2-pyrrolidinone; pyrene; 9,9'-bifluorene; phenothiazine; p-quaterphenyl; o-terphenyl; partially hydrogenated terphenyls; 4-phenylphenol; 4,4'-isopropylidenediphenol; 4,4'-dihydroxybenzophonene or mixtures thereof.

9. The process of claim 8 wherein the temperature of the organic pound and poly(etheretherketone) in Step (A) is between about 300° and 375° C.

10. The process of claim 9 wherein the temperature of solution and poly(etheretherketone) is about 330° C.

11. The process of claim 10 wherein greater than about 50% by weight of the poly(etheretherketone) is dissolved in the solvent.

12. The process of claim 1 wherein the polymer consists essentially of poly(etheretherketone).

13. The process of claim 1 wherein the polymer comprises poly(etheretherketone), poly(aryletherketone), poly(etherketone), poly(etherketoneketone) (PEKK), poly(etheretherketone) (PEEEK), poly(etheretherketoneketone) (PEEKK), poly(etheretherketoneetherketone) (PEEKEK), poly(etherketoneetherketoneketone) (PEKEKK), or mixtures thereof.

14. The process of claim 13 wherein the polymer further comprises poly(phenylene sulfide).

15. The process of claim 1 wherein the at least one organic compound is a mixture of aromatic compounds consisting essentially of carbon and hydrogen.

16. The article produced by the process of claim 1.

17. The article produced by the process of claim 16 wherein said article is selected from a film, a membrane, a solid fiber or a hollow fiber.

18. The article produced by the process of claim 8.

19. The article of claim 18 wherein said article is selected from a film, a membrane, a solid fiber, or a hollow fiber.

20. The process of claim 1 wherein in Step (A) the at least one organic compound further includes a poor solvent compound or a nonsolvent compound each themselves consisting essentially of carbon and hydrogen, and optionally oxygen, nitrogen, sulfur, halogen, or mixtures thereof having a molecular weight of between about 160 and 450 daltons and having at least one six membered aromatic ring structure which compound is stable at a temperature of between about 240° and 400° C., wherein the aggregate of said poor solvent compound and said non-solvent compound is present in between about 0.1 and 80. percent by weight of the total organic compound.

21. The porous article produced by the process of claim 20.

22. The article of claim 21 wherein said article contains less than about 5% by weight of organic compound, non-solvent or a mixture of organic compound and non-solvent.

23. The article of claim 21 wherein said article further comprises filters, stabilizers, additives, antioxidants, pigments, dyes, inhibitors or mixtures thereof.

24. A porous article comprising a polymer itself comprising poly(etheretherketone), which is produced by a process comprising:

A. contacting a polymer comprising poly(etheretherketone), with at least one organic compound, consisting essentially of carbon atoms and hydrogen atoms, and optionally oxygen atoms, nitrogen atoms, sulfur atoms, halogen atoms, or mixtures thereof, having a molecular weight of between 160 and 450 daltons and having at lest one six membered aromatic ring structure which compound is stable at a temperature of between 240° and 400° C. at ambient pressure, at a temperature of between about and 240° and 400° C. at ambient pressure for a time effective to dissolve greater than about 25% by weight of the poly(etheretherketone) present;

B. forming the solution of poly(etheretherketone) and organic compound of step (A) into a desired article configuration;

C. removing the organic compound; and

D. recovering the article comprising poly(etheretherketone) formed thereby.

25. The porous article of claim 24 which is also permeable, semipermeable or selectively permeable.

26. A porous article comprising a polymer itself comprising poly(etheretherketone), which is produced by a process comprising:

A. contacting a polymer comprising poly(etheretherketone), with at least one organic compound, is selected from: 2,5-diphenyl-1,3,4-oxadizole, 2-benzoylnaphthalene; diphenyl sulfone; fluoranthene; 9,10-diphenylanthracene; para-terphenyl; 4,4'-dimethoxybenzophenone; 2,6-diphenylphenol, 2,5-diphenyloxazole; diphenyl phthalate; triphenylene; 4,4'-dibromobiphenyl; 4-benzoylbiphenyl; 2-biphenylcarboxylic acid; 1,2,3-triphenylbenzene; triphenylmethanol; meta-terphenyl; triphenylmethane; 1,2-dibenzoylbenzene; dibenzoylmethane; 4-biphenylcarboxylic acid; 1-phenyl-2-pyrrolidinone; pyrene; 9,9'-bifluorene; phenothiazine; p-quaterphenyl; ortho-terphenyl; partially hydrogenated terphenyls; 4-phenylphenol; 4,4'isopropylidenediphenol or mixtures thereof, which compound is stable at a temperature of between 240° and 400° C. at ambient pressure, at a temperature of between about and 240° and 400° C. at ambient pressure for a time effective to dissolve greater than about 25% by weight of the poly(etheretherketone) present;

B. forming the solution of poly(etheretherketone) and organic compound of step (A) into a desired article configuration;

C. removing the organic compound; and

D. recovering the article comprising poly(etheretherketone) formed thereby.

27. The porous article of claim 24 which is also permeable, semipermeable or selectively permeable.

28. A porous article comprising poly(etheretherketone).

29. The porous article of claim 28 which is also permeable, semipermeable or selectively permeable.

30. The porous article of claim 21 which is also permeable, semipermeable or selectively permeable.

* * * * *